Dec. 11, 1928.
G. C. JETT
DISTRIBUTOR
Filed Dec. 10, 1923
1,694,657
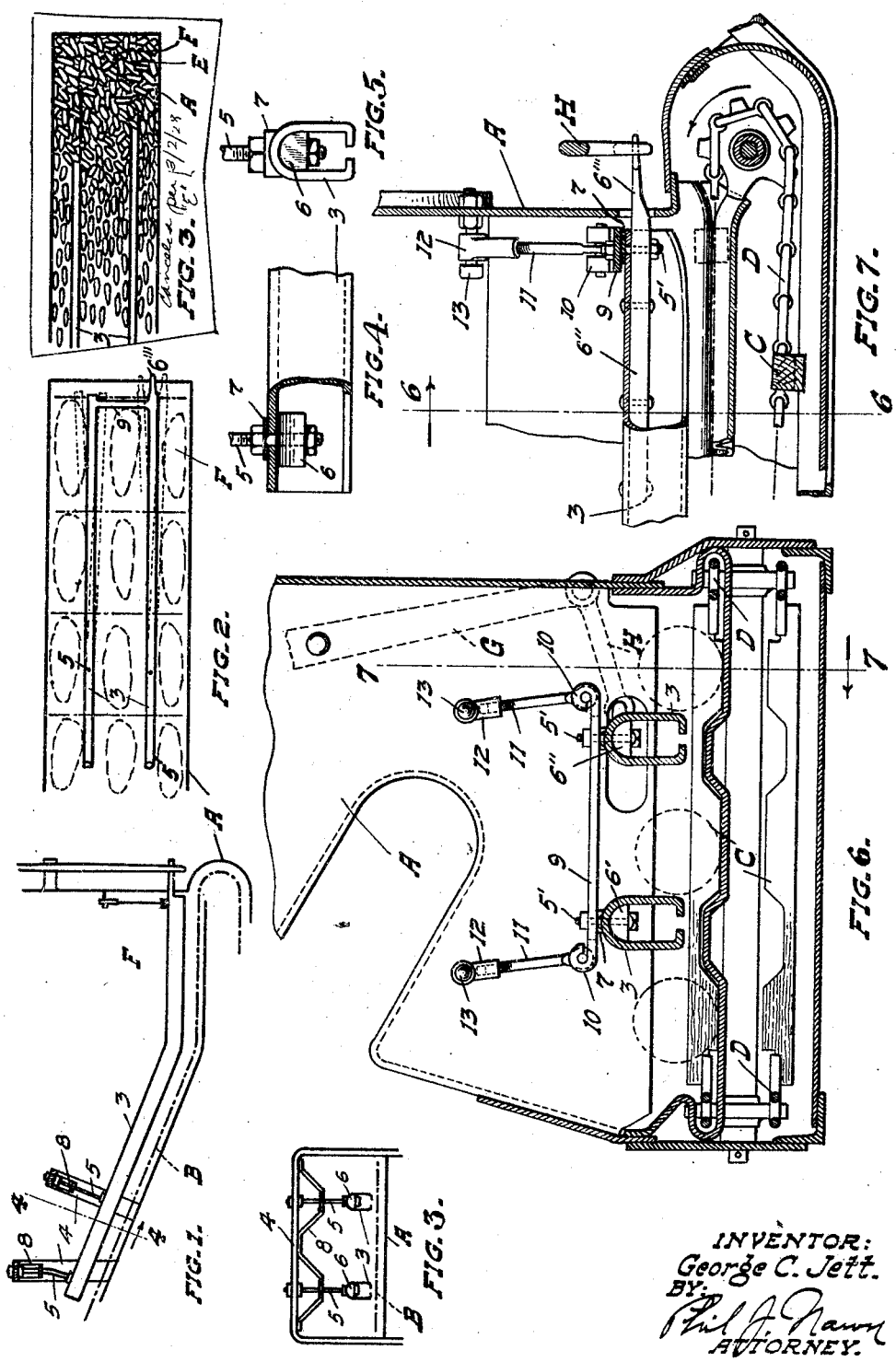
INVENTOR:
George C. Jett.
BY
ATTORNEY.

Patented Dec. 11, 1928.

1,694,657

UNITED STATES PATENT OFFICE.

GEORGE C. JETT, OF MILWAUKEE, WISCONSIN, ASSIGNOR TO RUNGE CORN HARVESTER COMPANY, OF MILWAUKEE, WISCONSIN, A CORPORATION OF WISCONSIN.

DISTRIBUTOR.

Application filed December 10, 1923. Serial No. 679,816.

This invention relates to distributing devices that are adapted for use in any structure handling unit shapes that will approximate, roughly, an elongated cylinder which is operated upon while occupying a position that leaves its longitudinal axis coincident with the line of travel in being advanced.

The invention is here shown as applied to a corn handling machine, because of the shape corn ears assume, forming a product that is efficiently handled, or righted in travel, by the introduction of the said distributors. Varying commodities, that are to be scattered from a heap and carried lengthwise, in some semblance of order, similar to corn ears, may be handled, also; the latter remark is intended to avoid a too stringent, limitation to the adaptability to this invention. Other objects and advantages of the improvement here considered will be recognized from the following:

Usually, the products to be affected by these distributors, is dumped in a heap into a kind of hopper, through which operates a conveyer means; said means would carry off the mass without respect to some desired position in which the units should lie, in order to be affected by some sort of mechanism farther along in the process of handling, if it were not for the effect obtained by the said distributors, which effect results in compelling the units to advance in procession with all of them lying lengthwise parallel to the line of directing followed by the conveyer. Also, in providing means whereby a deposited heap is induced to divide into rows or lanes, and to tumble into position while said division is transpiring, due to a continued agitation that shakes them down into said lanes causing them to seek a longitudinal berth. Further, in the supplying of plural shaking members, that can be adapted to any angularity of conveyer, which operates beneath them, in order to provide a separable number of lanes or passes, divided off by the distributors aforesaid. Further, in providing structural considerations, that are fashioned to shift the products, and at the same time, avoid injury to them, either directly, or in connection with the conveying means employed as a mutual adjunct. Further, in the arranging of distributor bars, that function as walls to form troughs above a conveyer element; the said troughs being supplied with products that have been withdrawn from a disordered deposit in a hopper, and devising the said bars to advance an even portioning of the products aforesaid. Further, allowing of a flexible attribute in the distributors, so that their agitative quality will be graduated in proportion to that desired; the maximum occurring at the point of deposit, and the minimum farther along in the path of travel, where the products have brought to the desired position. Further, in the transmitting of reciprocating action to a unified structure, having a plural effect in shaking the products and, at the same time, preserving an unchanging area between themselves. Also, in the providing of adjustable means whereby the distributors can be suspended at any desired level above the conveying means that is advancing the products aforesaid.

With the foregoing objects and other advantages set forth in the following specification, this invention consists of mechanical arrangements as herein described, pointed out in the claims and all equivalents thereof.

The accompanying drawings, intended as part of this application, comprise the following views:

Fig. 1 is a diagrammatic view, showing the distributor's parallel relationship to an inclined conveyer;

Fig. 2 is a plan of Fig. 1, showing the swing of the distributors in dotted lines;

Fig. 3 is a section on line 4—4 of Fig. 1;

Fig. 4 is a detail section of the bars' fixed terminals;

Fig. 5 is an end view of Fig. 4;

Fig. 6 is an enlarged section on line 6—6 of Fig. 7;

Fig. 7 is a section on line 7—7 of Fig. 6.

Similar characters of reference apply to like parts throughout the several views.

The character A designates the framework of a structure, to which this invention is applicable, and forms a passageway having a hopper end F, through which travels a conveyer B, provided with cross-slats C that are attached to the conveyer-chains D. This conveyer B is travelling in the direction indicated by the arrow in Fig. 7, and serves to carry away the products E that are deposited in the said hopper F of the frame element A, where said products accumulate in a haphazard fashion, and which must be advanced to where another operation (not shown) occurs. The operation aforesaid is most effective when the products E are presented so that their elongated aspects are parallel to the line of direction taken by the upper lap of the conveyer B, and with the said products advanced in columnar arrangement, with their individual units lying longitudinally, a condition attained gradually after leaving the deposit in the hopper F, as illustrated in Fig. 3 where the promiscuous deposit in the hopper portion is shown to be gradually arranged into the order desired. A correct comparison between the product, or corn-ear in this instance, and the conveying elements, being indicated in Fig. 6. This accomplishment is possible in a variety of commodities, such as, packages, or the like, whose disposal is facilitated when the said commodities are arranged in the same position; not necessarily ears of corn, as has been referred to here by way of illustration; nor, angular conveying means; the conveyer can be horizontal, or sinuate in contour, when the distributors, being shaped to parallel the said contours, will function equally as well.

Distributing, or, agitating bars 3 are suspended from suitable arching members 4, located near the one end of said bars, by means of threaded rods 5 that pass through the bars 3. The rods 5 are rigidly attached to the members 4 by sets of nuts which clamp either side of the said members, and a similar arrangement connects the bars 3 and the rods 5, in which arrangement there is introduced, a block 6 that fits the inner surface of the rounded upper edge of the bars 3 and is positioned between a nut and the said inner surface; the outer surface of the bars are fitted with a concave washer 7, which is located between another nut and the said outer surface. When this assembly is tightened up it holds the bars 3 in a manner that resists any tendency to twist, and compels the said bars to remain normal between the two separated points of suspension provided for each bar aforesaid. To further stabilize the bars 3 at the points just described, there are provided the straps 8, depending rigidly from the arching members 4; these straps 8 embrace the rods 5 somewhat below the members 4 for the purposes of bracing the said rods 5; the latter, by virtue of the nuts and threaded ends of the said rods, are permitted to be adjusted for a higher or lower level of the bars 3 at the aforesaid suspension points. At the opposite ends of the bars 3, in lieu of the aforementioned blocks 6, there is, integrally, attached the similarly shaped plates 6' and 6", riveted or welded to the bars 3, the said bars, last mentioned, and the plates aforesaid are bored to allow passage of stems 5', fitted with a set of washers 7, upon which is positioned a shackle 9, and this combination is rigidly held together by means of nuts upon the threaded stems 5'. The shackle 9 binds together the bars 3 at this opposite end, which has the bar reinforcing elements in the elongated form of the shaped plates 6' and 6", because of the increased weight placed upon the said bars 3 at this, the hopper portion F of the frame A. The said shackle 9 is provided with rolled eyelet terminals 10, to which are hinged the adjustable pendant rods 11, these rods are threaded to receive tapped pivoting eyelets 12, which latter are hung from studs 13 that are mounted in the framework A. The plate 6" differs only from the plate 6' in having an extended tongue 6''' that protrudes beyond the frame A, to which can be attached, any suitable means for agitating the distributors 3, said means being indicated here by a link and rocking-beam assembly, respectively, indicated as, H and G, whose motive force may be mechanical or manual; either consideration being without the scope of the here considered invention.

The bars 3 are, preferably, fashioned from sheet steel which can be shaped to follow any line or angle; besides, there are possibilities in pressed steel forms that allows of rounded effects in such structures as the bars 3, which would be valuable features in the handling of products where abrasion is to be avoided, together with the advantage of lightness combined with strength.

The method of suspending the bars 3 in the manner described, provides a spring-like attribute in the said bars, that induces the bars 3 to retain their normal position, as is shown in Fig. 2, between the points where are located the rods 5; beyond these anchorages, the bars are forcibly flexed by the oscillating means, and the said spring-like attribute permits of the necessary oscillation without engendering a species of crystallization in the bars 3, which would, otherwise have deteriorating effect on the constantly quivering bars 3; this quivering, or oscillation being indicated in dotted lines in the said Figure 2, diagrammatically. Figure 4 illustrates the troughs of which the bars 3 and the frame A form the walls; these troughs have a liberal capacity when filled with the products E righted in forwardling, as shown in Fig. 3, the said bars acting as partitions, that compel the said products to surge onward, by virtue of suitable conveying means, similar to that here considered, to the operating mechanisms, that can be geared to take care of any volume of products that may approach them.

The structure described is illustrative only and applicant reserves the right to introduce modifications and variations within the scope of the appended claims.

I claim:

1. The combination of a feedway for ears of corn, a slatted conveyor for effecting a positive advance of the ears along said feedway, and a plurality of laterally vibrating bars disposed lengthwise of said feedway for arranging the ears parallel to the direction of travel thereof.

2. The combination of a feedway for ears of corn, said feedway having a substantially horizontal ear receiving portion and an inclined portion leading therefrom, ear advancing means traversing said horizontal and inclined portions, and longitudinally extended laterally vibrating bars associated with both portions for arranging the ears parallel to the direction of advance thereof.

3. The combination of a feedway for ears of corn, said feedway having a substantially horizontal ear receiving portion and an inclined portion leading upwardly from said horizontal portion, slatted ear advancing means traversing both portions, and laterally vibrating means for arranging the ears parallel to the direction of advance thereof.

4. The combination of a feedway for ears of corn, a slatted conveyor for advancing the ears along said feedway, and laterally vibrating means for arranging and maintaining the ears lengthwise of said feedway during the advance thereof.

5. The combination of a feedway for ears of corn having a plurality of feed channels, laterally reciprocating means associated with said feedway for arranging the ears lengthwise of said channels, and means for advancing the ears in orderly procession along said channels.

6. The combination of a feedway for ears of corn having a plurality of feed channels, means for advancing the ears along said channels, and a laterally vibrating bar disposed lengthwise between adjacent channels for arranging the ears lengthwise therein.

7. In a distributor the combination of a feedway, a plurality of bars disposed lengthwise above said feedway, supporting means for said bars adjacent one end thereof, a swinging support for said bars adjacent the other end thereof, means connected with said bars at said last mentioned end for vibrating the same laterally of said feedway, and a conveyor associated with said feedway beneath said bars.

In testimony whereof I affix my signature.

GEORGE C. JETT.